United States Patent
Grove et al.

[15] 3,656,498
[45] Apr. 18, 1972

[54] BALL VALVE

[72] Inventors: Marvin H. Grove; Kee W. Kim, both of Houston, Tex.

[73] Assignee: M & J Valve Company, Houston, Tex.

[22] Filed: Jan. 4, 1971

[21] Appl. No.: 103,642

[52] U.S. Cl..........................137/246.22, 137/312, 251/172, 251/174
[51] Int. Cl.......................................................F16k 5/22
[58] Field of Search..............137/246.22, 312; 251/172, 174

[56] References Cited

UNITED STATES PATENTS

| | | | |
|---|---|---|---|
| 3,378,026 | 4/1968 | Oliver | 137/246.22 |
| 3,416,558 | 12/1968 | Works | 137/246.22 |
| 3,421,733 | 1/1969 | Stewart | 251/174 X |

*Primary Examiner*—Harold W. Weakley
*Attorney*—Flehr, Hohbach, Test, Albritton & Herbert

[57] ABSTRACT

A valve of the ball type having a ported rotatable valve member (i.e., valve ball) within a valve body, and a sealing assembly which provides a seal between the body and the valve member. The sealing assembly includes a metal ring having non-metallic resilient sealing means which contacts the valve working surface of the valve ball. The fluid pressure areas of the sealing assembly are such that line pressure for flow in either direction does not cause the seal between the sealing means and the valve member to be broken. The ring is fitted and guided within the valve body in such a manner as to prevent cocking. The non-metallic resilient sealing means carried by the metal ring provides a double seal on two concentric areas, and ducts permit communication with the space between such sealing areas from the exterior of the body. Preferably only one sealing assembly is employed, and this is located in that portion of the body which is integral with the main portion of the body, whereby the remaining welded-on body part may be applied in the final phases of manufacture without disturbing the alignment of the valve member or injury to the sealing assembly.

8 Claims, 3 Drawing Figures

FIG_1

INVENTORS
MARVIN H. GROVE
BY KEE W. KIM
Flehr, Hohbach, Test,
Albritton & Herbert
ATTORNEYS

3,656,498

BALL VALVE

BACKGROUND OF THE INVENTION

This invention relates generally to valves of the ball type such as are employed for controlling flow of liquids and gases. It is applicable to a wide range of valve sizes, including particularly large valves suitable for pipe transmission lines.

Valves of the ball type generally are characterized by a rotatable valve member or ball which has a substantially continuous spherical sealing surface, together with sealing assemblies that surround the flow passages of the valve body and which establish sealing engagement with the ball for open and closed positions. Each of the sealing assemblies generally includes a ring which is fitted within an annular recess formed in the valve body, and which is urged by spring means toward the valve ball. In some instances the ring is made of metal or other relatively rigid material with an insert of non-metallic resilient material for establishing sealing contact with the surface of the ball. It is generally deemed desirable to proportion the fluid pressure areas on the sealing assemblies whereby a pressure resisting seal is established mainly upon the upstream side of the valve, with the downstream assembly being self-relieving to avoid trapping of pressure within the valve body. In some instances the valve ball may be free-floating between the sealing assemblies, but in most instances the ball is provided with trunnions which are journalled in the upper and lower sides of the body.

Various difficulties have been encountered with ball valves of the type just described. Abrasive solids tend to accumulate within the valve body and between the sealing assemblies, with the result that such solid material may find its way between the sealing assemblies and the spherical valve working surfaces of the ball, thus tending to interfere with the desired seal and causing abrasion and deterioration of the valve sealing surfaces. It is not uncommon for a ball valve to become inoperative or to require excessing turning torque because of accumulated solids. The use of two sealing assemblies adds materially to cost of manufacture. Aside from the cost of manufacture and machining, assembly is difficult because of the necessity of ensuring proper alignment between the ball and the two sealing assemblies for both open and closed positions. Assuming that the valve body is made in two parts, with one main part providing the journalling for the ball and a recess for mounting one of the assemblies, the other assembly is generally carried by another bolted or welded-on body part which is applied in one of the final steps of assembly after the ball and one of the sealing assemblies has been applied. It has been found difficult to carry out such a welding or bolting operation without disturbing the alignment or causing injury to one of the sealing assemblies.

In the past, block-and-bleed has been used in connection with both gate and ball valves to determine if the seals are properly functioning. Here again it has been deemed necessary to employ two sealing assemblies to isolate the body space between the seals. When used on gas lines, block-and-bleed is not generally employed since the discharge of substantial quantities of gas may be required to reduce the body pressure to atmospheric. Even with liquids, the amount of fluid discharged from block-and-bleed may be objectionable.

In view of the foregoing, it is evident that there is need for an improved ball valve construction which will overcome the difficulties outlined above. Particularly, there is need for a simpler construction which is less expensive with respect to the materials employed, machining, and assembly operations. Also there is need for improved sealing means and for leak detection means which does not have the disadvantages of present block-and-bleed. Also there is need for a ball valve which is less susceptible to the action of solids carried by the line, whereby objectionable accumulation of solids does not tend to occur as in conventional ball valves, and whereby the seal is not seriously affected when such solids are present.

SUMMARY OF THE INVENTION

In general, it is an object of the present invention to provide an improved ball valve construction which avoids many of the difficulties of present conventional ball valves.

More specifically, it is an object of the invention to provide a ball valve having simplified sealing means, and particularly with a single sealing assembly carried by the body which establishes a seal between the body and the ball for line flow in either direction.

Another object of the invention is to provide an improved ball valve construction which tends to avoid accumulation or entrapment of solids from the line fluid in the valve body space.

Another object of the invention is to provide a valve of the above type which avoids excessive torque and which is not subject to cocking of the sealing assembly during turning of the valve ball between operating positions.

Another object of the invention is to provide a ball valve having novel means for determining if the sealing means is properly functioning without leakage, while at the same time providing a sealing means which has fluid pressure areas whereby line fluid in either direction does not tend to break the desired seal.

Another object of the invention is to provide a novel ball valve sealing means which can be lubricated or supplied with a plastic sealant, and which can also be used in such a manner as to detect any leakage.

Another object of the invention is to provide a ball valve with a single sealing assembly and with separate annular valve working surfaces on the valve wall, whereby if certain surfaces become abraded or worn during usage, another alternate valve working surface can be employed.

Additional objects and features of the invention will appear from the following description in which the preferred embodiment has been set forth in detail in conjunction with the accompanying drawing.

DESCRIPTION OF THE PREFERRED EMBODIMENT

Figure 1:
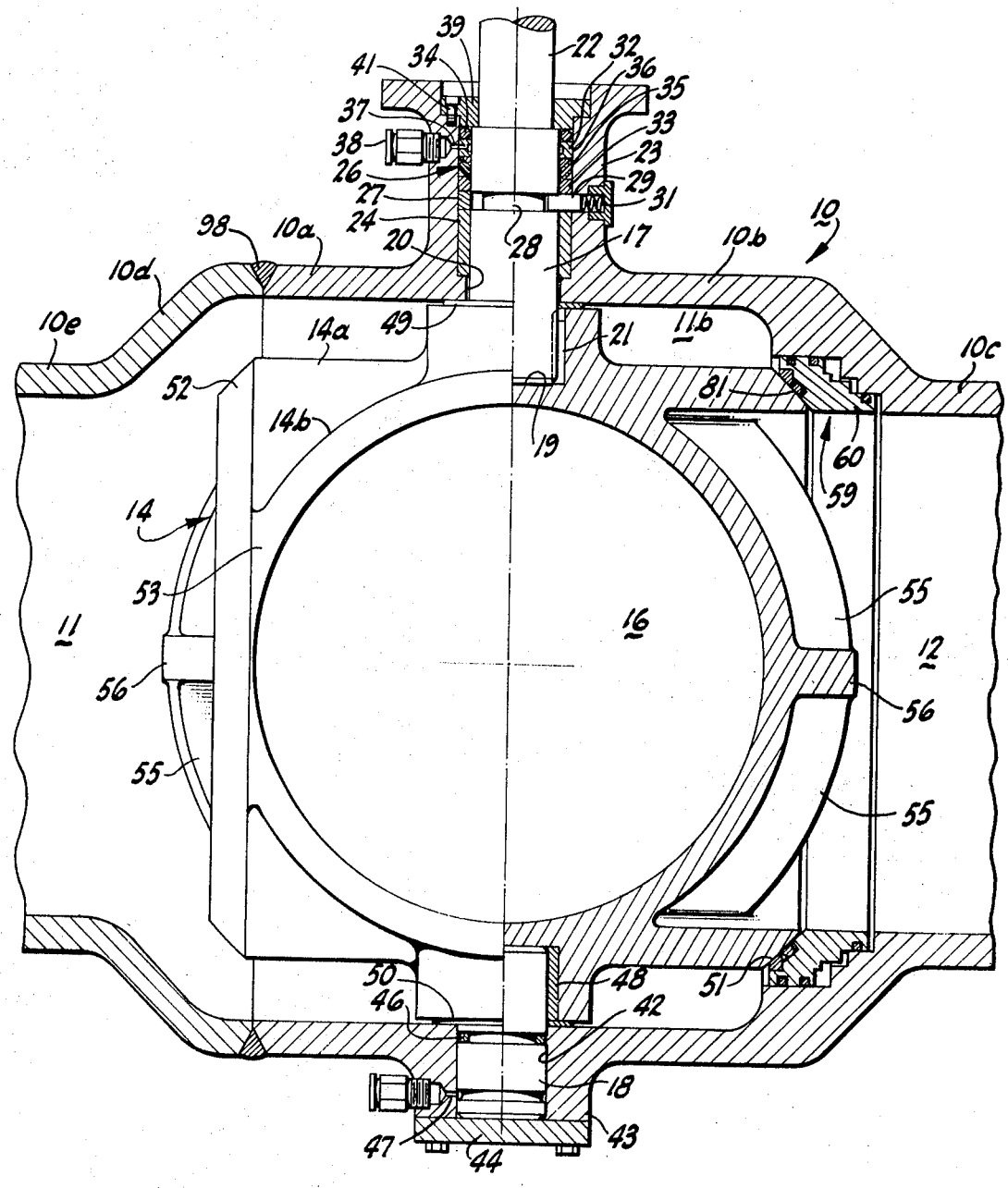
FIG. 1 is a side elevational view in section illustrating the invention, the ball or rotary valve member being shown in half section and the body in full section.

The ball valve illustrated in the drawing consists of a body 10 having aligned flow passages 11 and 12 adapted to be connected with associated piping. The body space 13 between the flow passages 11 and 12 is occupied by the rotatable ball or valve member 14. This ball has a port 16 extending transversely through the same, which is adapted to register with the flow passages 11 and 12 for full open valve position. The closed position of the ball 14 is displaced angularly 90° from full open position.

The body 10 may be a metal casting as illustrated, or it may be fabricated by welding from mill steel shapes. Also the ball 14 is shown as a metal casting, but here again the ball may be of the fabricated type. Aligned trunnions 17 and 18 are provided together with journal means for rotation of the ball between its operating positions. The trunnions and associated journal means carry the thrust of line pressure when the valve is closed and during opening and closing operations. The trunnion 17 is fitted into a bore 19 formed in the valve ball, and is non-rotatably fixed with respect to the ball by the key 21. Thus trunnion extends through a bore 20 in the body, and its exterior end is provided with the stem 22 which connects to suitable operating means. The body also has an extension 23 which is annular in section and which surrounds the trunnion. A suitable bushing 24 or other journal means forms a bearing or journal for trunnion 17, and above the bushing there is a sealing gland indicated generally at 26. Between bushing 24 and sealing gland 26 there is a split spacer ring 27, and that part of the trunnion surrounded by ring 27 is provided with a groove 28. A retractable pin 29 is carried by the body extension 23, with its inner end accommodated in groove 28. It is normally urged into the groove 28 by compression springs 31. When pin 29 is retracted, the trunnion 17 may be withdrawn or applied to accommodate assembly operations or servicing.

The sealing gland 26 in this instance consists of spacer rings 32 or 33, which may be made of suitable metal, together with sealing means 34 of the O-ring type, and a plurality of sprung annuluses 35 which may be made of suitable material such as relatively hard nylon. The annuluses 35 are made flat and during assembly they are dished or sprung as shown in FIG. 1 whereby their inner peripheral edges are urged into sealing engagement with the periphery of the trunnion, and their outer peripheral edges urged into sealing engagement with the surface 36 of the bore within which the sealing gland is accommodated. The space between the O-ring 34 and the nylon annuluses 35 is preferably in communication with the duct 37, whereby upon removing plug 38 this space can be vented to the atmosphere to determine whether or not leakage is occurring past the annuluses 35. Also in place of the plug 38, a suitable pressure lubricating fitting can be applied to supply a lubricant or plastic sealant. The gland assembly is held in place by the retainer 39, which is secured by suitable means such as cap screws 41. The sealing means just described is similar to that shown in application, Ser. No. 864,023 filed Oct. 6, 1969.

The lower trunnion 18 is fitted within the bore 42 in the lower body extension 43. Extension 43 is provided with the removable closure 44, and suitable sealing means 46, such as a seal of the O-ring type, serves to prevent leakage between trunnion 18 and the body. A suitable lubricant can be applied through the duct 47. The upper or inner end of the trunnion 18 is journalled within the bushing 48, which in turn is fitted within the valve ball. One or more washers or shims 49 and 50 are shown interposed between the ball and the adjacent portions of the body to ensure proper alignment.

The cast metal body illustrated consists of the medial portion 10a which may be substantially cylindrical in form, and which is provided with the extensions 23 and 43 to mount journals for the trunnions. The body portion 10b merges body portion 10a with the portion 10c of smaller diameter. Portion 10c may be a hub adapted to be secured by bolting flanges or welding to associated piping, or in some instances the associated piping may be welded directly to the portion 10b. Portion 10d corresponds with portion 10b, but is made as a separate part which is secured to the medial portion 10a of the body during final stages of assembly. It likewise provides a portion 10e of reduced diameter corresponding with the portion 10c. The two portions 10a and 10d are shown secured together by welding 98. As previously mentioned, in some instances it may be desirable to employ bolting flanges in place of welding.

The valve ball 14 is not a complete sphere provided with a substantially continuous spherical surface. As illustrated, it is formed of annular wall portions 14a and 14b which in general conform to two cylinders intersecting with each other at right angles. A valve surface 51 is formed on the end of one of the portions 14a and conforms generally to the surface of a sphere generated about the center of the ball. A similar surface 52 may be formed on the other portion 14a, or such a surface may be omitted to simplify machining. The portions 14b are shown provided with end surfaces 53 and 54 which may be coincident with the same sphere as that to which surface 51 is coincident. However, since surfaces 53 and 54 are not required to have a sealing function, it is preferable that they be coincident with a sphere of lesser diameter. Arcuate reinforcing ribs 55 and 56 are shown with that end of the portion 14b on which surface 51 is formed.

Figure 2:
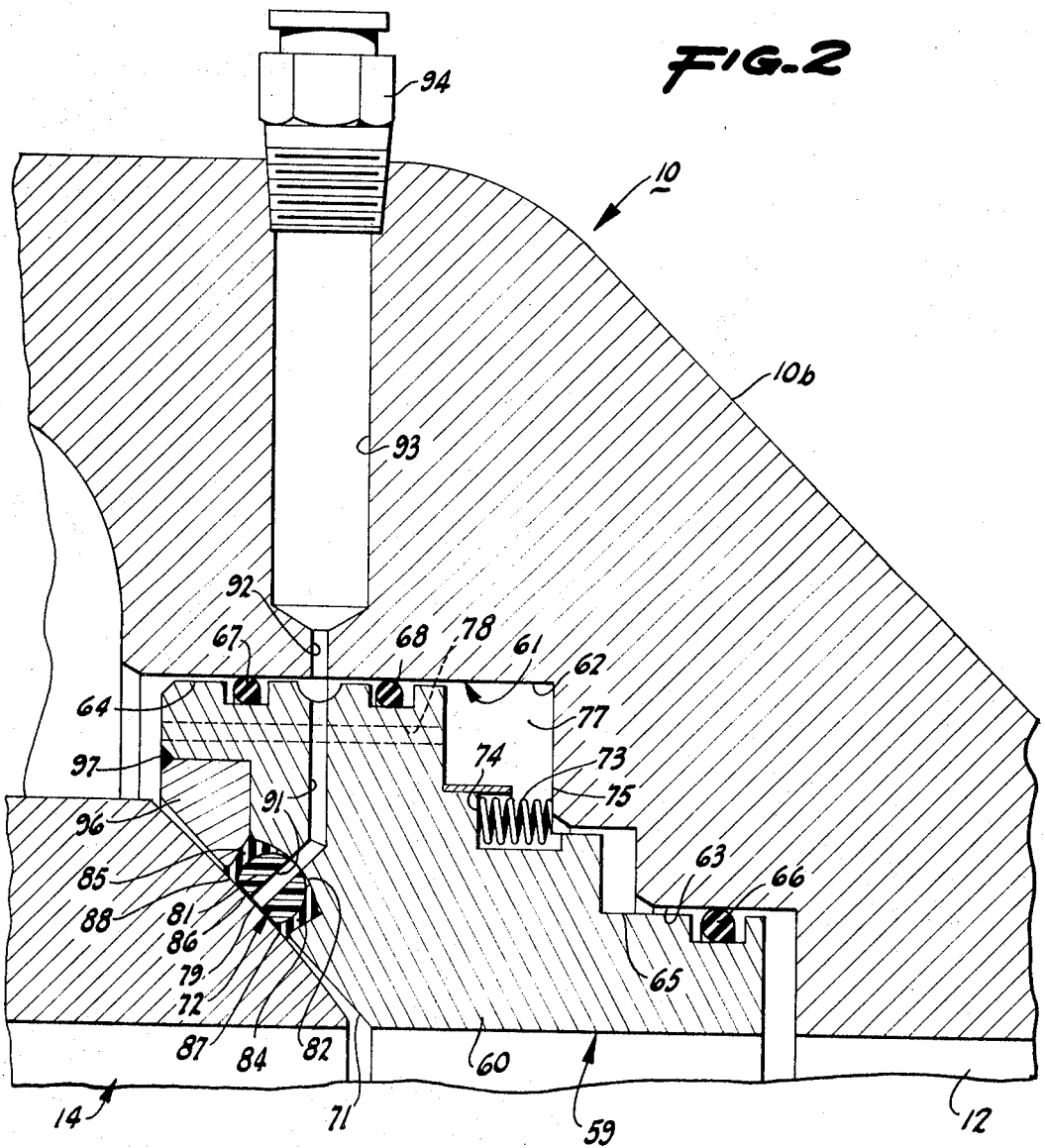
FIG. 2 is an enlarged detail in section showing the sealing means incorporated in the valve of FIG. 1.
Figure 3:
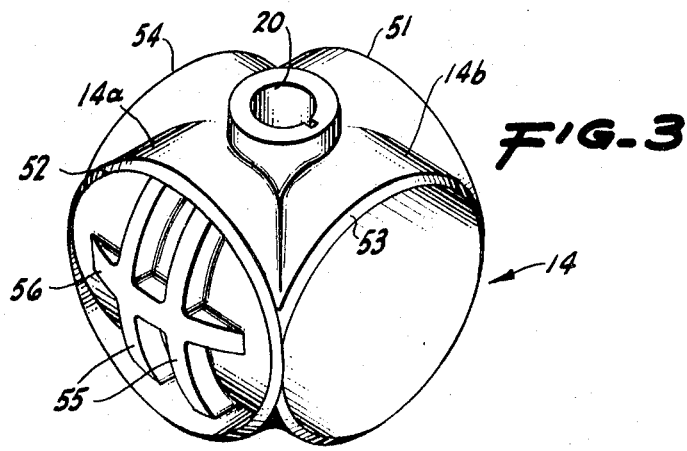
FIG. 3 is a perspective view illustrating the rotary valve member before assembly in the body.

A single sealing assembly 59 (See FIG. 2) is carried by the body part 10b and is arranged to surround the flow passage 12. The assembly consists of a ring 60 that is relatively rigid and made of suitable material such as metal. It is slidably fitted within a recess 61 machined in the body and formed to provide two concentric cylindrical surfaces 62 and 63 on two diameters. The ring 60 is formed with a larger cylindrical surface 64 which slidably fits within the surface 62, and a smaller cylindrical surface 65 which slidably fits within the surface 63. Suitable sealing means 66, such as one of the resilient O-ring type, is carried by the ring 60 and prevents leakage between the surfaces 63 and 65. Also sealing means 67 and 68, which again may be sealing means of the resilient O-ring type, is carried by the ring 60 and prevents leakage between the surfaces 62 and 64. Seals 67 and 68 are spaced apart as illustrated, whereby they seal in two spaced regions. The surface 71, which normally is adjacent to the valve surface 51, is made to conform with the surface of a cone as illustrated. Ring 60 is provided with an insert assembly 72 made of non-metallic resilient material, and this assembly establishes sealing engagement with the adjacent valve working surface 51 of the ball.

Spring means is provided for normally urging the ring 60 toward the ball. In this instance compression springs 73 are distributed circumferentially about the annular recess which accommodates ring 60, with one end of each spring engaging the annular ring shoulder 74, and the other end engaging the shoulder 75 formed on the body.

With the sealing assembly as described above, it is evident that an annular space 77 is formed within the body recess between the seals 66, 67 and 68. This space is in free communication with the body space 13 through one or more ducts 78 formed in the ring 60.

The insert assembly 72 preferably is constructed as disclosed and claimed in copending applications, Ser. No. 17,365 filed Mar. 9, 1970 and Ser. No. 21,074 filed Mar. 19, 1970. More specifically, it can consist of a rod or bar 81 which is bent in the form of a hoop or ring, and which is made of relatively hard synthetic material such as nylon or Teflon. In general, this material can have a durometer hardness of the order of 85 to 90 (D scale). The nylon ring is accommodated within a recess 82 formed within the metal ring 60, and its inner and outer peripheral surfaces are engaged by the compressed more resilient annular members 84 and 85. These members can be made of suitable synthetic rubber, and may for example have a durometer hardness of the order of 60 to 85 (A scale). The exposed face 86 of the nylon insert is generally parallel to the conical surface 71 of the ring 60, but is offset forwardly a slight distance. The end faces 87 and 88 of the more resilient insert members 84 and 85 are likewise finished whereby they conform to a conical surface parallel to the surface 71 but offset a slight distance beyond the surface 86.

With an insert assembly as described above, the annular surfaces formed by the faces 87 and 88 of the more resilient insert members 84 and 85 are normally somewhat compressed and for closed valve position they are urged into sealing engagement with the valve working surface 51 of the ball. The sealing contacts are established along two concentric annular areas. It is desirable to provide means which permits communication from the exterior of the valve with the space between these two concentric sealing areas. For this purpose a duct 91 is shown which extends through the nylon ring 81 and terminates in communication with the space between the two resilient O-rings 67 and 68. The latter space is in turn in communication with duct 92 in the body, and this duct communicates with the larger bore 93. Bore 93 may normally be closed by a plug, or may be closed by a fitting 94 usable for introducing a suitable plastic sealant. Assuming introduction of a plastic sealant under pressure, it will be evident that the sealant will be applied through the duct 91 and through the insert assembly 72 into the space between the faces 87 and 88 of the resilient insert members 84 and 85, thus ensuring an effective seal.

To facilitate introduction of the insert assembly 72 into the metal ring 60, it is desirable for one side of the accommodating recess 82 to be formed by the separate ring 96. This ring can be applied after the insert assembly 72 has been properly positioned, with sufficient force being applied to ensure proper compression of the members 84 and 85. Ring 86 can be held in place by welding 97.

Assembly of the valve can be carried out as follows. Before the body portion 10b has been secured to the remainder of the body by the weld connection 98, the sealing assembly 59 is introduced into its accommodating recess, substantially as shown in FIG. 1. With the closure 44 removed, the trunnion 18 is inserted part way into the bore 42, but without having its inner end extending within the body sufficiently far to prevent placement of the ball. Trunnion 17 is likewise inserted part way into the bore 20, with the retainer 39 removed, and without the sealing gland 26. The ball is now inserted into the body through the left hand end as viewed in FIG. 1, and the axis of the ball aligned with the axes of the upper and lower trunnions. At the same time one of the valve working surface of the ball, as for example the surface 51 as shown in FIG. 1, is aligned with the flow passage 12, whereby in the final positioning of the ball the surface 51 is in engagement with the insert assembly 72, with the ring 60 being moved into its accommodating recess with a substantial amount of compression of springs 73. The trunnions 17 and 18 are then moved to their final positions, with the upper end of trunnion 18 being located within the journal bushing 48, and the lower end of the trunnion 17 being located within the bore 19 and engaged by the key 21. Final positioning of the trunnion 17 permits the pin 29 to enter the groove 28, thus locking trunnion 17 against retraction. The parts of the sealing gland 26 are now assembled within the bore 36, and with the nylon annuluses 35 being dished as they are placed in their operating positions. The retainer 39 is now applied and secured to the body extension 23. In the assembly operations just described, it is assumed that washers or shims 49 and 50 are positioned and are of proper dimensions to secure the desired alignment.

During or after the assembly operations described above, the alignment of the ball with respect to the sealing assembly 61 is checked. Specifically, the alignment should be such that when the ball is rotated 90° between full open and closed limiting position, one of the annular valve working surface 51 of the ball is brought into proper alignment and sealing relationship with the insert sealing assembly 72. For full open position the port 16 in the ball should properly register with the flow passage 11 and 12. Thereafter the remaining portion 10d of the body is properly positioned relative to the medial body portion 10a, and the weld 98 applied to complete the body. Although this welding operation may cause considerable localized heating of the body, it cannot detrimentally affect the remote sealing assembly 72, and it cannot cause any misalignment between the sealing assembly and the annular valve working surfaces of the ball.

As previously explained, the sealing assembly described above provides sealing contacts on two concentric annular areas formed by the faces 87 and 88 of the silient members 84 and 85. A characteristic of this assembly is that when subjected to a pressure differential from the flow passage 12, a pressure holding seal is formed by the face 87 of resilient member 84. However, under such conditions the seal formed by the face 88 of member 85 is self-relieving in that it will not hold any substantial pressure differential applied to its inner periphery. On the other hand, if a pressure differential is applied from the body space 13, then a pressure seal is formed by the face 88 of resilient member 85 while the face 87 of resilient member 84 is self-relieving.

Although the valve described above is bidirectional insofar as line flow is concerned, the sealing assembly 72 will maintain a seal with the ball under all operating conditions. Assuming that the right hand side of the valve as shown in FIG. 1 is the upstream or high pressure side, the fluid pressure area presented by the sealing assembly is such that the ring 60 is urged toward the left against the ball. This is because the diameter of the cylindrical surface 63 of the body corresponds with the mean diameter between the sealing areas established by the faces 87 and 88 of the resilient members 84 and 85, and is greater than the diameter of face 87 of member 84. Also it is because of the self-relieving action of resilient face 88 under such conditions. Likewise, if the left hand side of the valve as shown in FIG. 1 represents the upstream or high pressure side, the fluid pressure area presented by the ring 60 will again tend to urge the ring against the ball. This is because the diameter of the cylindrical surface 63 is slightly less than the diameter of the sealing area established by the face 88 of insert member 84, and because face 87 is self-relieving. Therefore, under all operating conditions, fluid pressure tends to urge the sealing assembly against the ball, and in addition the sealing assembly is at all times urged toward the ball by the compression springs 73. The force of these springs is sufficient to establish initial sealed engagement with the ball under no or low pressure conditions. Under operating conditions the ball can be rotated 90° between full open and closed positions without excessive torque. During such movements any gritty solids which may have become associated with the valve working surfaces or sealing assembly are given an opportunity to be dislodged into the fluid flow. Thus wear upon the valve surfaces is maintained at a minimum. Because of the configuration presented by the valve member, as distinguished from a ball having a continuous spherical surface, there is ample space about the ball for flow of line fluid as the ball is being rotated between closed and open positions. Also the clearance between the sealing assembly and the ball for open position permits some line flow about the ball. This flushes out any solids tending to accumulate around the ball, with the result that such solids do not accumulate to the extent that the ball becomes locked against or requires excessive torque for rotation.

Normally the ball is rotated 90° between full open and closed positions. A suitable stop pin is secured to the operating stem 22 to provide limits for such turning movement. In full open position it is desirable to have some clearance between ring 60 and one of the end annular faces 53 or 54. In the event the valve surface 51 should become worn because of abrasion or erosion, the stop pin can be reset to permit operation of the ball between limits which bring the other surface 52 into engagement with the sealing assembly for closed position, assuming that surface 52 has been machined for this purpose.

The ribs 55 and 56 are generally considered desirable, particularly for valves made in the larger sizes. They serve to reinforce the wall of the ball surrounded by the valve surface 51.

If under operating conditions it is desired to determine if the sealing assembly is leaking, the bore 93 is vented momentarily to atmosphere and then connected with a pressure indicator to detect any rise in pressure. Any such pressure build-up between the concentric sealing areas indicates a leak. Pressure build-up for such indication is less than that required to effect the self-relieving action described above.

We claim:

1. In a ball valve, a valve body having aligned flow passages and a body space between the passages, a rotatable valve member disposed within the body space and located between the flow passages, said valve member being rotatable about an axis which is perpendicular to the axes of the flow passages and having a port extending transversely through the same which is adapted to register with the flow passages for open valve position, said valve member also having at least one annular valve surface on the same conforming generally to the surface of a sphere, said annular surface being located on one closed side of the valve member and displaced 90° with respect to the axis of the port, journal means for the valve member carried by the body, and an annular sealing assembly carried by the body and surrounding one of the flow passages, said sealing assembly being adapted to engage said annular valve surface when the valve member is in closed position.

2. A ball valve as in claim 1 in which said sealing assembly comprises a metal ring slidably fitted within an annular recess formed in the body, the periphery of said ring being formed to provide two peripheral cylindrical surfaces formed on two different diameters, the larger diameter cylindrical surface being nearest to the valve member and the smaller diameter cylindrical surface being more remote from the valve member, the annular recess being formed to provide complementary cylindrical surfaces into which the cylindrical surfaces of the ring are slidably fitted, sealing means formed of non-metallic resilient material carried by one end face of the ring and adapted to contact an adjacent valve working surface of the valve member, sealing means forming a fluid-tight seal between the larger diameter cylindrical surfaces of the recess and the ring, sealing means forming a seal between the smaller diameter cylindrical surfaces of the recess and ring, there being an annular space formed between the body and the ring between said last-named sealing means, and spring means located within the last-named annular space serving to urge the ring against the valve member.

3. A valve construction as in claim 2 in which the mean effective diameter of the sealing means between the smaller diameter cylindrical surfaces is substantially the same as the mean diameter of the non-metallic sealing means carried by the ring.

4. A valve construction as in claim 3 together with a vent serving to establish communication between the body space and said annular space.

5. A valve construction as in claim 3 in which the sealing means between the larger diameter cylindrical surfaces is of the O-ring type consisting of two spaced O-rings, and means for establishing communication between the space between said O-rings and the exterior of the valve body.

6. A valve construction as in claim 2 in which the non-metallic sealing means carried by the ring and adapted to contact said valve working surfaces includes resilient sealing members adapted to establish sealing contact on two annular areas of different diameters, the ring and the valve body having ducts whereby communication is established between the space between said sealing areas and the exterior of the valve body.

7. A valve construction as in claim 1 in which the body is made of two parts joined by welding, the one main part serving to carry said sealing assembly, the journal means for the valve member being also carried by said main part of the body, the welding being at that end of the body that is remote from the sealing assembly.

8. A ball valve as in claim 1 in which the rotatable valve member has another annular valve working surface located on the opposite closed side of the valve member, said valve member being rotatable to cause said other valve working surface to establish sealing engagement with the sealing assembly.

* * * * *